United States Patent

Itoh et al.

[11] Patent Number: 6,152,175
[45] Date of Patent: Nov. 28, 2000

[54] PROCESS GAS SUPPLY UNIT

[75] Inventors: Masahito Itoh; Toshiyasu Inagaki, both of Kasugai; Minoru Ueta, Kasuga; Masahiko Yada; Hiroshi Itafuji, both of Kasugai, all of Japan

[73] Assignee: CKD Corporation, Komaki, Japan

[21] Appl. No.: 09/089,346

[22] Filed: Jun. 3, 1998

[30] Foreign Application Priority Data

Jun. 6, 1997 [JP] Japan ................................ 9-148820

[51] Int. Cl.⁷ ................................................ F16K 51/00
[52] U.S. Cl. .......................... 137/602; 137/606; 137/884
[58] Field of Search ................................. 137/884, 606, 137/602

[56] References Cited

U.S. PATENT DOCUMENTS

| | | | |
|---|---|---|---|
| 3,589,387 | 6/1971 | Raymond | 137/884 |
| 3,654,960 | 4/1972 | Kiernan | 137/884 |
| 3,915,194 | 10/1975 | Friedrich | 137/884 |
| 4,168,724 | 9/1979 | Graffunder et al. | 137/606 |
| 4,703,913 | 11/1987 | Hunkapiller | 137/884 X |
| 4,823,834 | 4/1989 | Ariizumi et al. | 137/884 X |
| 4,848,405 | 7/1989 | Albrecht | 137/884 |
| 4,911,195 | 3/1990 | Farnsworth et al. | 137/606 X |
| 5,640,995 | 6/1997 | Packard et al. | 137/884 X |
| 5,720,317 | 2/1998 | Nimberger | 137/884 X |
| 5,810,115 | 9/1998 | Mismas | 137/557 X |
| 5,836,355 | 11/1998 | Markulec et al. | 137/269 X |

FOREIGN PATENT DOCUMENTS 6-241400  8/1994  Japan.

*Primary Examiner*—Kevin Shaver
*Assistant Examiner*—John Bastianelli
*Attorney, Agent, or Firm*—Finnegan, Henderson, Farabow, Garrett & Dunner, L.L.P.

[57] ABSTRACT

A process gas supply unit without conventional pipes. The process gas supply unit may include the components of a mass flow controller, an input valve, an output valve, a purge valve, a vacuum valve, a check valve, a regulator, and a filter. Module blocks are attached to at least one of the components with bolts from a predetermined direction. The module blocks are mounted on base plates with bolts from the same predetermined direction, and the base plates are mounted on a mounting panel with bolts from the same predetermined direction.

11 Claims, 16 Drawing Sheets

PROCESS GAS SUPPLY UNIT

BACKGROUND OF THE INVENTION

1. Field of the Invention

The present invention relates to a process gas supply unit used in a semiconductor manufacturing process and, more particularly to a process gas supply unit provided with components parts such as a process gas supply valve, a purge valve, a check valve, a vacuum valve, a mass flow controller, a regulator, a filter, and the like.

2. Description of Related Art

A process gas supply unit supplies process gas such as etching gas in a semiconductor manufacturing process. In this semiconductor manufacturing process, a cut sheet process for processing wafers one by one is being substituted for a batch process for processing plural wafers at the same time. The cut sheet process requires a small-sized process gas supply unit.

To make a small-sized process gas supply unit, the applicant of the present invention has proposed a process gas supply unit as disclosed in Japanese Patent No. 2,568,365 wherein a supply valve, a purge valve, and a vacuum valve are fixed with bolts from above on a module block acting as a manifold.

FIG. 15 shows a structure of the process gas supply unit using the manifold. This unit is an embodiment of a flow circuit diagram shown in FIG. 16, which is described below.

In FIG. 16, a process gas is supplied from a left end of the supply unit and discharged from a right end of same. A manual valve 1, a check valve 2, and a regulator 3 are connected in order. The regulator 3 is connected to an input valve 5. A pressure gauge 4 is connected in the flow passage between the regulator 3 and the input valve 5. The input valve 5 is connected to an input port of a mass flow controller 8 to which a purge gas source is connected through a purge valve 6 and a check valve 7.

An output port of the mass flow controller 8 communicates with an output valve 10 and also to a vacuum pump which is a vacuum source through a vacuum valve 9. The output valve 10 is connected to a manual valve 11 whose exit port communicates with a vacuum chamber in the semiconductor manufacturing process.

Next, the process gas supply unit embodying the flow circuit diagram of FIG. 16 will be described referring to FIG. 15.

All of main devices are fixedly mounted on a mounting panel 12 with bolts. A bracket B1 connects the manual valve 1 to the panel 12. The manual valve 1 is provided, at either end, with pipes 1a and 1b and joints M. The pipe 1b and the joint M disposed in a downstream side of the manual valve 1 are connected to the check valve 2. A joint M and a pipe 3a connect the check valve 2 to the regulator 3. The regulator 3 is fixed on the panel 12 by a bracket B2 (whose structure is the same as the bracket B1).

On the right side of the regulator 3, a trifurcated pipe 5a and joints M connect the regulator 3 to a manifold C1, and a trifurcated pipe 4a connects to the pressure gauge 4. On an upper plane of the manifold C1, the input valve 5 and the purge valve 6 are mounted. A pipe 6a and a joint M connect the check valve 7 to a port of the manifold C1 for the purge valve 6. The check valve 7 is connected to a purge gas source not shown through a joint M. Here, the passage formed by the check valve 7 and the pipe 6a is provided on a plate A1.

The manifold C1 is fixed on the panel 12 through a plate A1 and is connected to a mass flow controller block D. A mass flow controller 8 is mounted on an upper plane of the mass flow controller block D. The right end of the mass flow controller block D is connected with a manifold C2 (whose structure is the same as the manifold C1). The vacuum valve 9 and the output valve 10 are mounted on the manifold C2. Then vacuum valve 9 is connected with the vacuum pump which is a vacuum source. The manifold C2 is fixed on the panel 12 through a plate A2 (whose structure is the same as the plate A1). Here, a flow passage extending from the check valve 7 is contiguous to a channel formed in the plate A2.

The manifold C2 is connected with the manual valve 11 through a joint M and a pipe 11a. The manual valve 11 is secured on the panel 12 by a bracket B3 (whose structure is the same as the bracket B1) and is connected at its right end with a vacuum chamber through a pipe 11b and a joint M.

The supply unit shown in FIG. 15 uses the manifold C1 on which the input valve 5 and the purge valve 6 are integrally mounted from above by fastening bolts. A supply unit could be reduced in size as compared with the supply unit in which all of the main devices are connected with each other through pipes. The supply unit shown in FIG. 15 is too big for recent process gas supply units which must be reduced in size and integrated. Many pipes and joints are required in the FIG. 15 supply unit design, needing large space and causing the generation of particles in many weld joint portions of the pipes. This generation of particles affects a yield of a semiconductor to be manufactured, which is an important problem.

In the FIG. 15 design, to detach the manifold C1 and the plate A1, on which the input valve 5 and the purge valve 6 are mounted, from the mounting panel 12, the mounting panel 12 must be turned over because the plate A1 is fixedly mounted on the panel 12 with bolts from below, thus requiring removal of all of the devices fixedly mounted on the panel 12. This is extremely inconvenient since the mounting panel 12 is generally fixed on a wall and the like in firm contact therewith to reduce an installing space for the process gas supply unit in the semiconductor manufacturing process. The same applies to the manifold C2 and the plate A2 on which the vacuum valve 9 and the output valve 10 are mounted.

SUMMARY OF THE INVENTION

The present invention has been made in view of the above circumstances and has an object to overcome the above problems and to provide a compact integrated process gas supply unit. Further, according to one embodiment, all devices or components can be attached or detached from the same direction.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a process gas supply unit of the present invention is provided with a module block to which one or more component part to be used for supplying process gas is attached with bolts, a base plate onto which the module block is fixedly installed with bolts, and a mounting panel on which the base plate is mounted with bolts.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

DETAILED DESCRIPTION OF THE PREFERRED EMBODIMENTS

In a process gas supply unit according to the present invention, one or more components selected from the group consisting of a mass flow controller, a supply valve, a purge valve, a vacuum valve, a check valve, a regulator, and a filter are attached onto a module block with bolts from above (a predetermined direction). A plurality of the module blocks are integrally mounted on base plates with bolts from above (the same predetermined direction as above). Furthermore, the base plates are fixed on a mounting panel with bolts tightened from above (the same predetermined direction as above).

Accordingly, all of component parts are directly mounted on the module blocks or the base blocks without pipes, which makes it possible to achieve an entirely integrated process gas supply unit, thereby reducing its whole size. Also, the process gas supply unit contains no pipes for connecting the component parts with each other in the process gas flow passage and has substantially no weld jointed portions of pipes, preventing the generation of particles in the pipes.

Since all component parts are mounted on the module blocks, all of the module blocks are mounted on the base plates, and all of the base plates are mounted on the mounting panel with bolts from the same direction, detachment or attachment of the components, the module blocks, and the base plates can be made without detaching the mounting panel even if closely fixed on a machine or wall. If all of the bolts are unified in diameter and length, the detachment/attachment operation needs no classification of bolts according to size, thus more increasing an operational efficiency.

A V-shaped passage formed in the base plate needs no extra stopper and provides no extra space where process gas may remain during a purging operation. This can prevent the generation of particles caused due to corrosion of the pipes by process gas.

Also, the base plates are positioned in place by the engagement between positioning pins formed in the base plates and the positioning holes formed in the mounting panel, so that plural base plates can be placed with an accurate positional relationship to each other even when they are disposed in a direction orthogonal to plural rows of module blocks arranged in parallel, each of which constructs a process gas line, thus preventing leaks of process gas or the like.

Furthermore, the head of a bolt fastening the base plate on the mounting panel lies inside the counter bore, coming out of sight and therefore, it is unlikely that the base plate is detached from the mounting panel in error. Since the bolt head is hidden from an operator, the operator is not required to take extra confirming operation and thus the efficiency of maintenance operations can be raised.

A detailed description of a preferred embodiment of a process gas supply unit embodying the present invention will now be given referring to the accompanying drawings.

Figure 3:
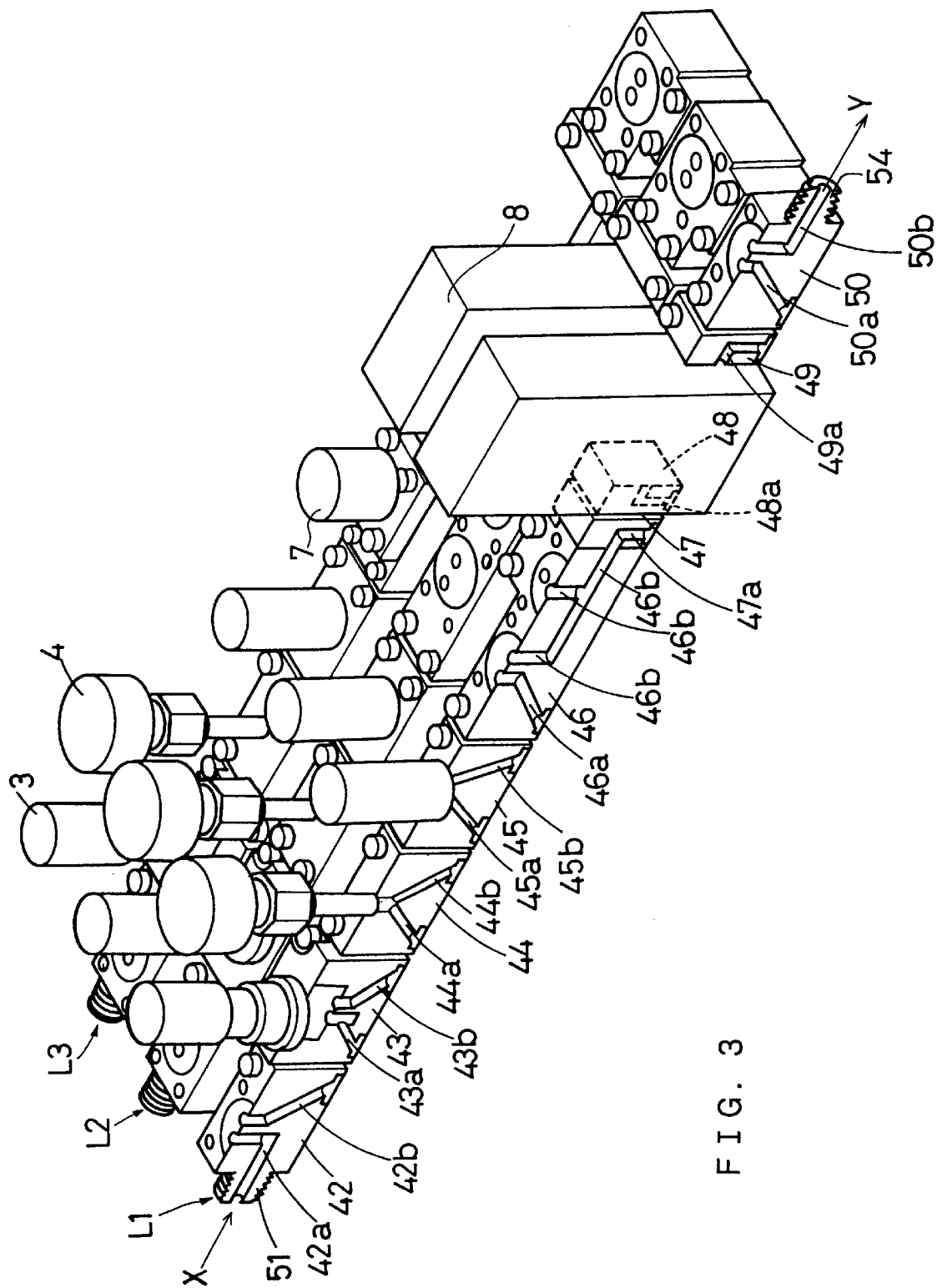
FIG. 3 is a perspective view of components and module blocks of the process gas supply unit in the first embodiment.
Figure 4:
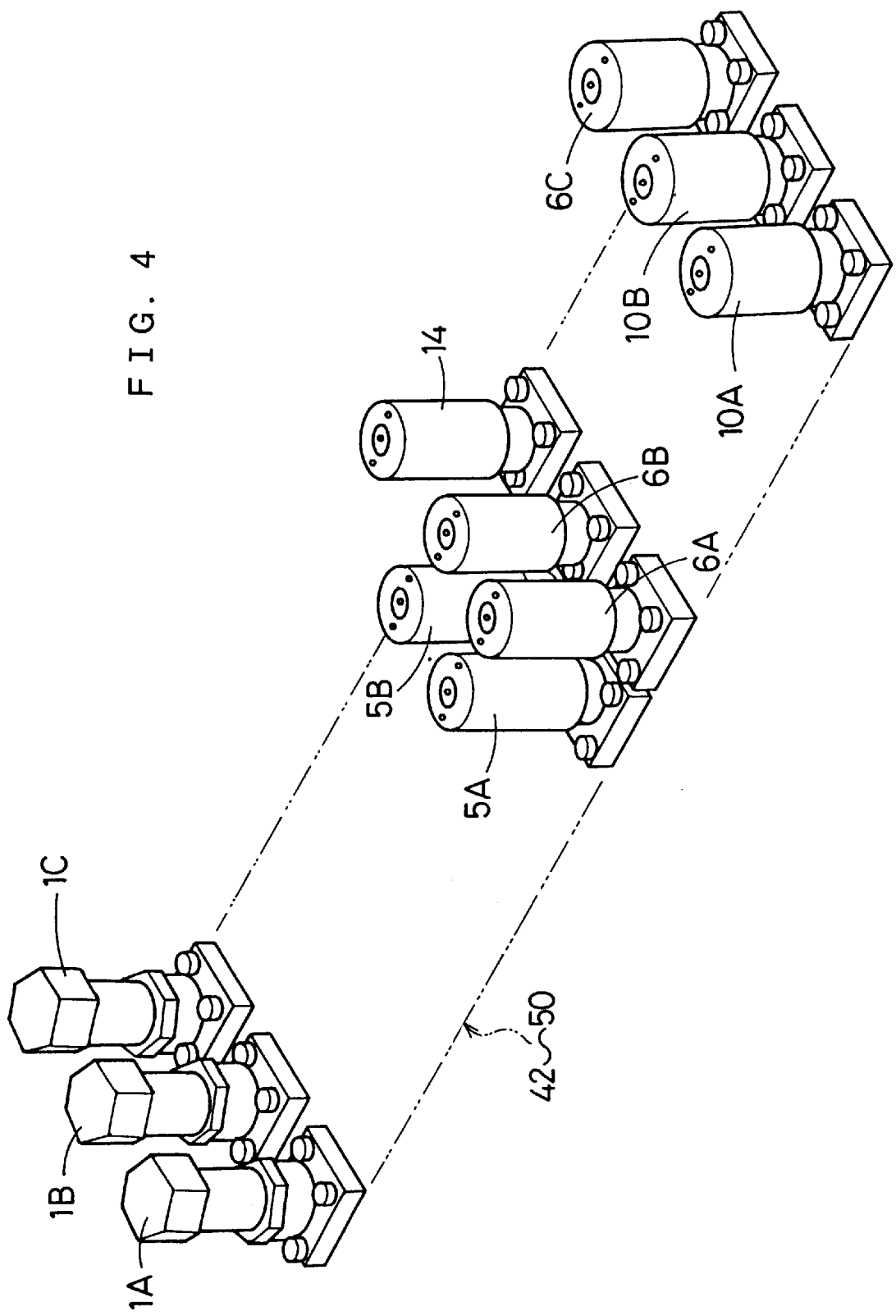
FIG. 4 is a perspective view of components to be assembled in the module blocks of FIG. 3 in the first embodiment.
Figure 5:
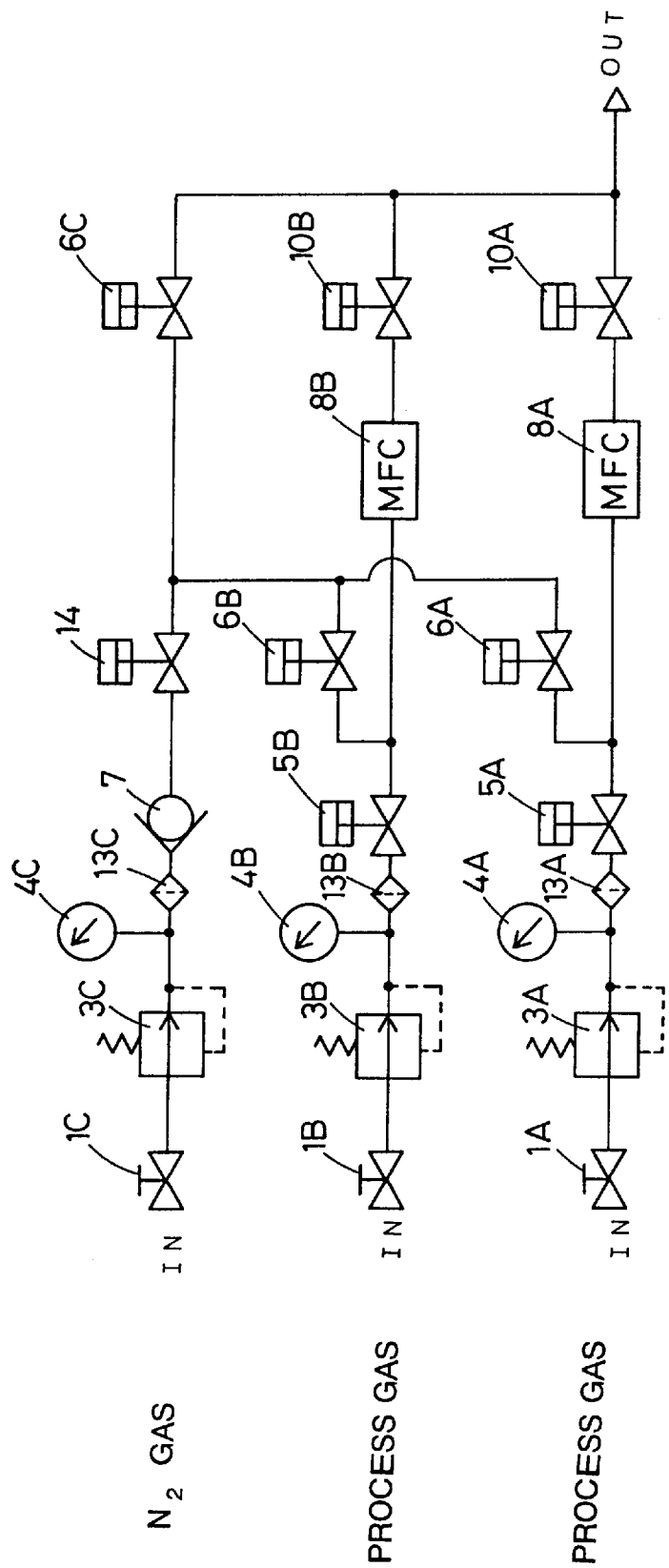
FIG. 5 is a diagrammatic view showing the flow circuit of the process gas supply unit in the first embodiment.

FIGS. 1 to 4 show a perspective view of each part of the process gas supply unit in the first embodiment. FIG. 5 is a circuit diagram of the unit.

Figure 1:
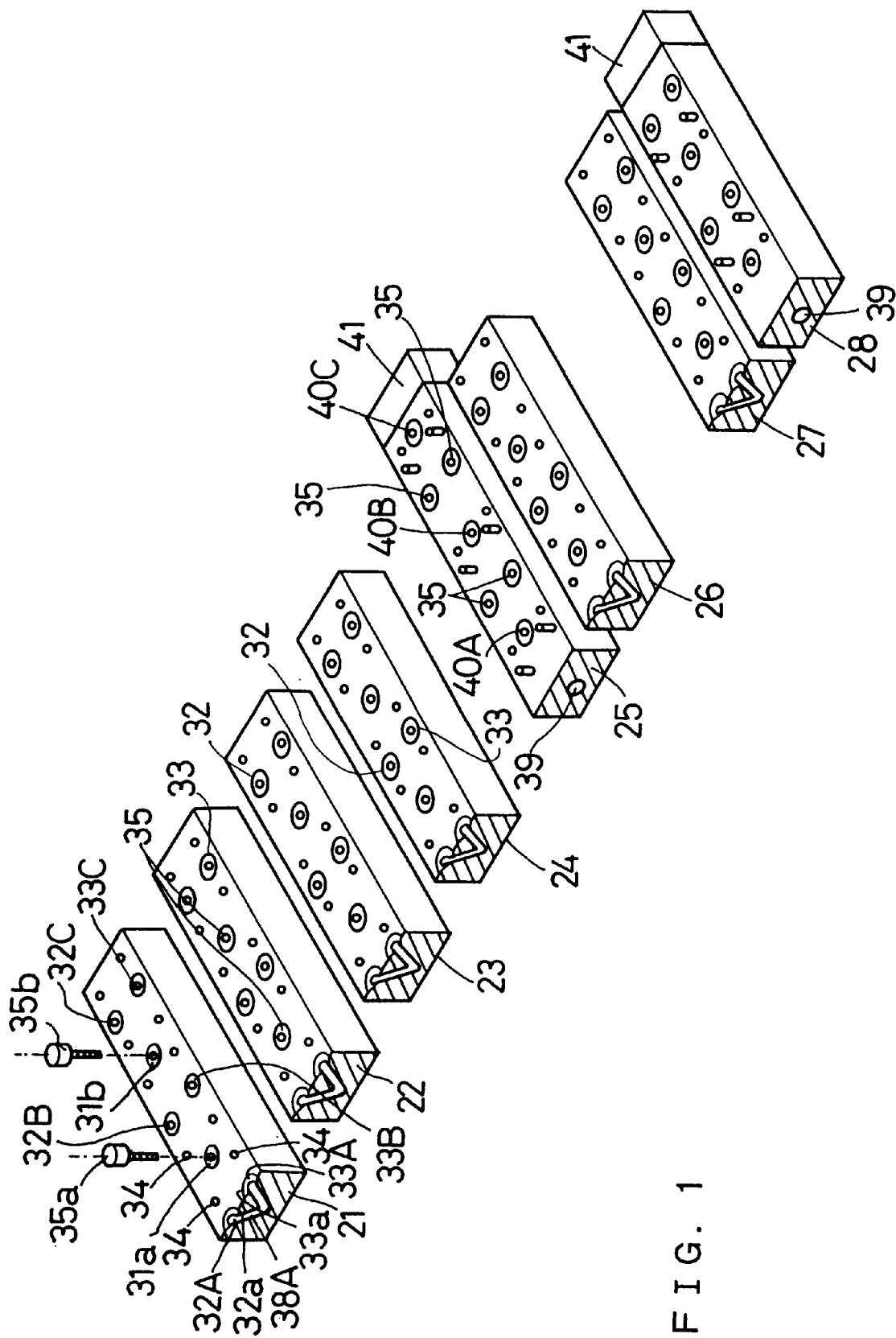
FIG. 1 is a perspective exploded view of base plates of a process gas supply unit in a first embodiment according to the present invention.
Figure 2:
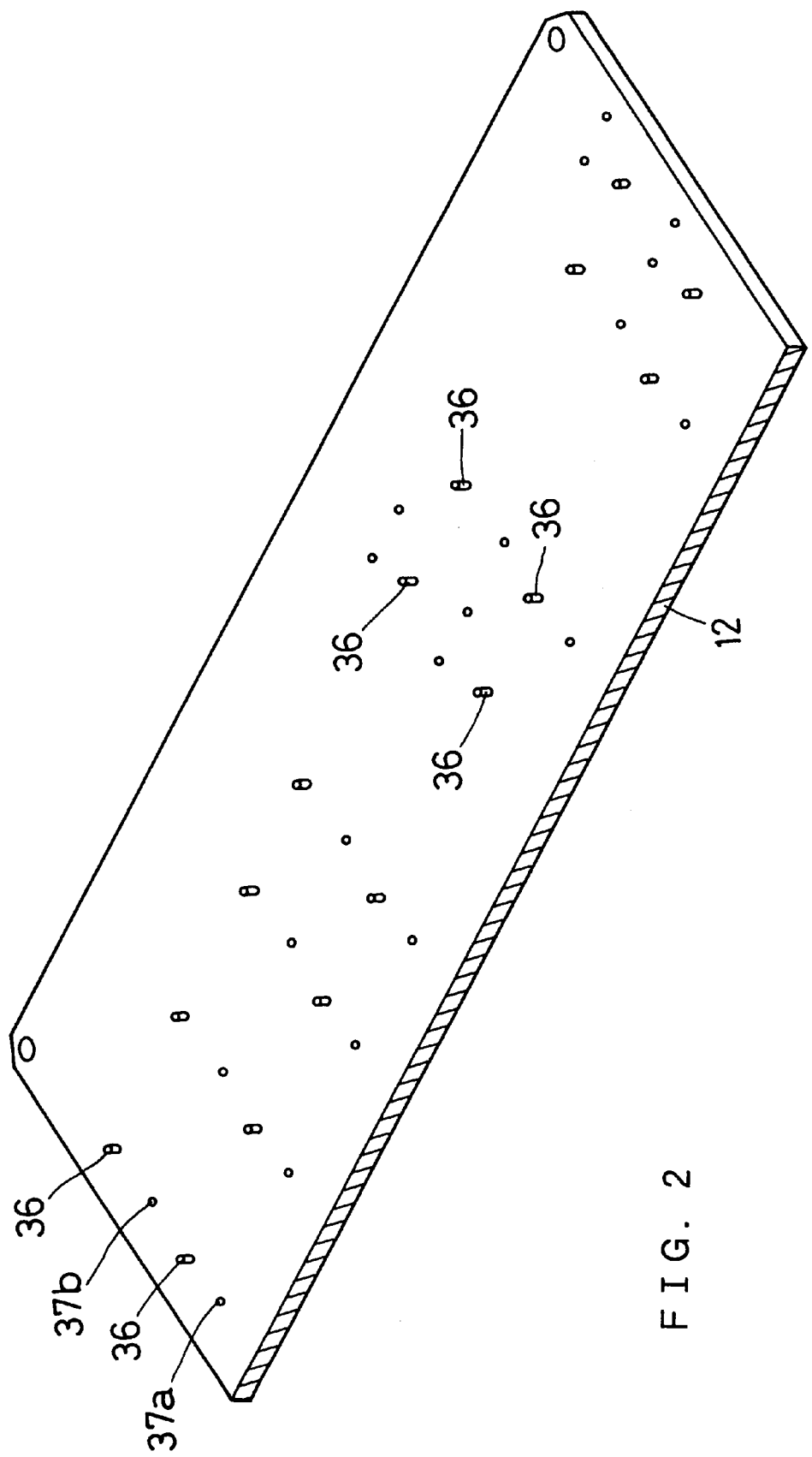
FIG. 2 is a perspective view of a mounting panel of the process gas supply unit in the first embodiment.

More specifically, FIG. 1 is a perspective view of base plates 21, 22, 23, 24, 25, 26, 27, and 28 used in the process gas supply unit. FIG. 2 is a perspective view of a mounting panel 12. FIG. 3 is a perspective view of module blocks and the components mounted thereon, i.e., a regulator, a pressure gauge, a filter, a check valve, and a mass flow controller. FIG. 4 is a perspective view of a manual valve and an automatic open/close valve mounted on the module blocks of FIG. 3.

At first, the circuit of the process gas supply unit shown in FIG. 5 is described below. In the first embodiment, the circuit of the process gas supply unit is constructed for supplying two kinds of process gas A and B. The process gas supply unit includes two process gas supply lines and a purge gas supply line for supplying purge gas C, which are constructed as below. In FIG. 5, the capital letters A, B, and C attached to the numerals correspond to the gas supply lines for process gas A, B, and purge gas C respectively.

In the process gas supply line, a manual valve 1A (1B) whose input port communicates with a process gas source is connected with a regulator 3A (3B). This regulator 3A (3B) is connected with a filter 13A (13B). A pressure gauge 4A (4B) is connected in the flow passage between the regulator 3A (3B) and the filter 13A (13B). The filter 13A (13B) is connected with an input valve 5A (5B) which is an automatic open/close valve.

The input valve 5A (5B) is connected with a mass flow controller (MFC) 8A (8B). A purge valve 6A (6B) which is an automatic open/close valve is connected with a flow passage between the input valve 5A (5B) and the MFC 8A (8B). This MFC 8A (8B) is connected with an output valve 10A (10B) which is an automatic open/close valve whose output port communicates with a vacuum chamber.

An input port of the purge valve 6A (6B) is connected to a purge gas main valve 14 which is an automatic open/close valve. This purge gas main valve 14 is connected with a filter 13C through a check valve 7. The filter 13C is connected with a regulator 3C. A pressure gauge 4C is connected in the flow passage between the filter 13C and the regulator 3C connected via a manual valve 1 with a tank storing nitrogen gas for a purge gas. An output port of the purge gas main valve 14 communicates with a purge valve 6C connected to output ports of the output valves 10A and 10B.

Next, an embodied structure of the process gas supply unit of the above circuit will be described below.

In FIG. 1 each sectional view of the base plates 21 to 28 is illustrated to show internal passages in the foreground in the drawing.

For instance, a base plate 21 is a rectangular parallelpiped block, in an upper surface of which formed are counter bores 31a and 31b, input ports 32A, 32B, and 32C, and output ports 33A, 33B, and 33C. Tapped holes 34 for bolts are formed on both sides of each of the input ports 32A–32C and the output ports 33A–33C. While the rectangular parallelpiped block shape is preferred for easy integration, the broader invention is not limited to this shape.

The input port 32A (32B, 32C) and the output port 33A (33B, 33C) are connected to each other through a V-shaped passage 38 as shown in FIG. 1. On the input port 32A (32B, 32C) and the output port 33A (33B, 33C), counter portions 32a (32b, 32c) and 33a (33b, 33c) are formed to receive a ring gasket for preventing the leak of gas in a connected portion between the base plate and a module block mounted thereon. Positioning holes not shown are formed in each back surface of the base plates 21–28.

On the other hand, as shown in FIG. 2, positioning pins 36 are inlaid in the mounting panel 12, protruding from an upper surface of the panel 12. Also, tapped holes 37a and 37b are formed in the panel 12 to receive bolts 35 for mounting the base plates on the panel 12. In the present embodiment, the bolt 35 is a hexagon socket head bolt having a thread size of 5 mm.

A mounting way of the base plate 21–28 on the mounting plate 12 is described hereinafter.

The base plates 21–28 of FIG. 1 are fixedly mounted on the mounting plate 12 with the bolts 35 from above.

Explaining one example thereof, the base plate 21 is attached onto the mounting panel 12 by engaging the positioning holes formed on the back surface of the base plate 21 with the positioning pins 36 (two pins in this embodiment) formed on an upper surface of the mounting panel 12 and then two bolts 35a and 35b are screwed into the tapped holes 37a and 37b through the counter bores 31a and 31b. In this attached state, each head of the bolts 35a and 35b lie completely under the upper surface of the base plate 21. Similarly, the other base plates 22–28 are attached onto the mounting panel 12.

In a case of the base plate 25, different from the base plate 21, the base plate 25 is attached on the mounting panel 12 with four bolts 35 after two positioning pins 36 of the plate 12 have been inserted in the positioning holes of the base plate 25.

In the base plate 25, a through hole 39 is formed in a longitudinal direction of the plate. Both ends of the through hole 39 are closed by end plates 41. Purge gas ports 40A, 40B, and 40C are formed in an upper surface of the base plate 25, communicating with the through hole 39. Counter bores for receiving the bolts 35 are formed in the base plate 25 so as to be positioned on both sides of the through hole 39 at two positions to displace the bolts 35 from the through hole 39.

In the present embodiment, the above two types of base plates 21 and 25 are used. Here, the base plates 22–24, 26, and 27 are the same type as the base plate 21 and the base plate 28 is the same type as the base plate 25 and therefore, the same numeral is applied to the same member or part in the same type of base plates.

Next, a module block will be described with reference to FIG. 3. The module blocks preferably have a rectangular parallelpiped block shape for easy integration. However, the broader invention is not limited to that shape. In FIG. 3, arranged parallel to one another are module block rows L1 and L2 for supply lines to supply process gas A and B respectively, and a module block row L3 for a supply line to supply purge gas. In the supply line for process gas A, for example, process gas A is input from a direction X and output to a direction Y.

Each of the module block rows L1–L3 comprises a manual valve block 42 in the gas input side, a regulator block 43, a pressure gauge block 44, a filter block 45, an input valve block 46, an input valve second block 47, a mass flow controller block 38, the MFC 8 (however, which is not provided in the module block row L3), a mass flow controller output block 49, and an output valve block 50.

Figure 6A:
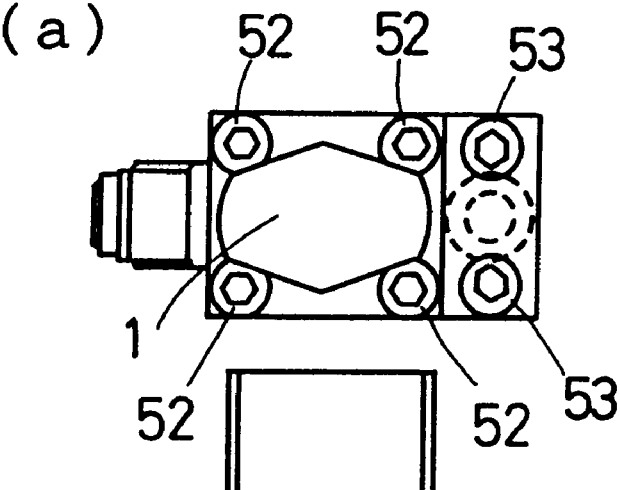
FIG. 6(a) is a plane view of a manual valve module in the process gas supply unit.
Figure 6B:
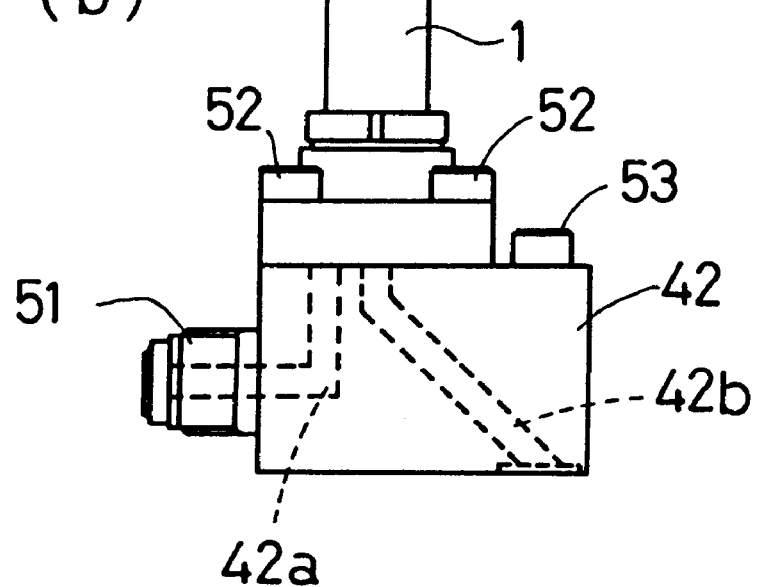
FIG. 6(b) is a side view of the manual valve module of FIG. 6(a)

The manual valve block 42 on which the manual valve 1 is mounted forms a manual valve module, whose structure is shown in FIGS. 6(a) and 6(b). The manual valve 1 is attached from above to the manual valve block 42 with four bolts 52. An input joint 51 is attached to a left end plane of the manual valve block 42.

In the manual valve block 42, formed are a right-angled passage 42a for connecting the input joint 51 and an input port of the manual valve 1, and a slanting passage 42b for connecting an output port of the manual valve 1 and the input port 32(A, B or C) of the base plate 21. The manual valve block 42 is attached to the base plate 21 with two bolts 53. In the present embodiment, a hexagon socket head bolt having a thread size of 5 mm is used for the bolts 52 and 53.

Figure 7:
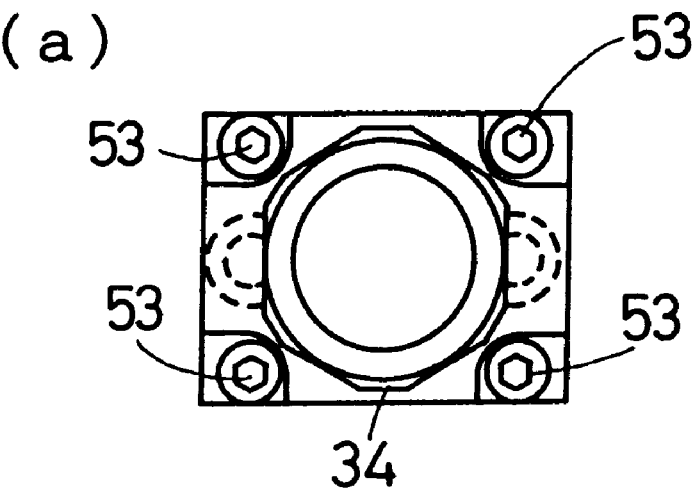
FIG. 7(a) is a plane view of a regulator module in the process gas supply unit.
FIG. 7(b) is a side view of the regulator module of FIG. 7(a)
Figure 7:
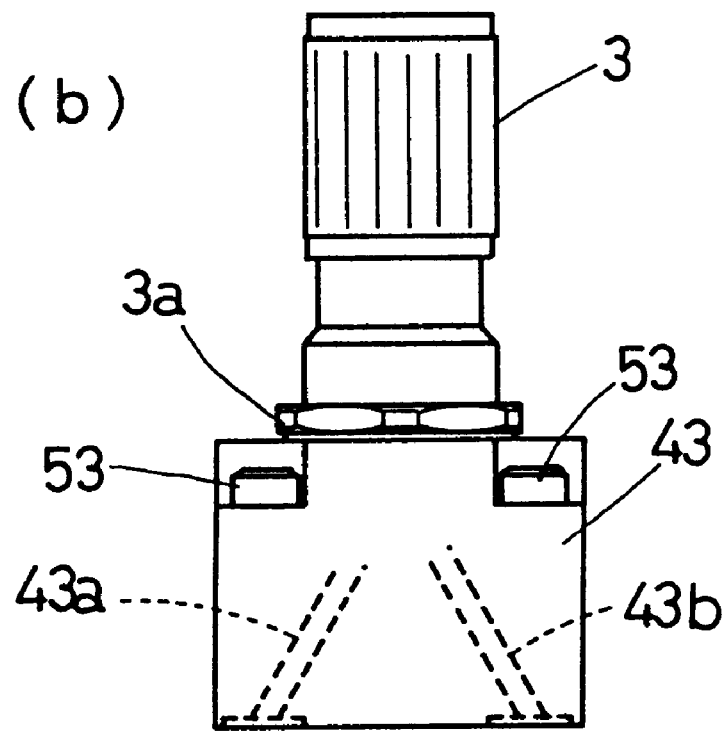

The regulator block 43 on which the regulator 3 is mounted forms a regulator module, which is shown in FIGS. 7(a) and 7(b). As shown in FIG. 7(b), the regulator 3 is attached to the regulator block 43 by a cap type of nut 3a. The regulator block 43 is fixedly mounted on the base plates 21 and 22 with four bolts 53. In the regulator block 43, formed are a slanting passage 43a for connecting an input port of the regulator 3 with the output port 33(A, B or C) of the base plate 21, and a slanting passage 43b for connecting an output port of the regulator 3 with an input port 32(A–C) of the base plate 22.

Figure 8A:
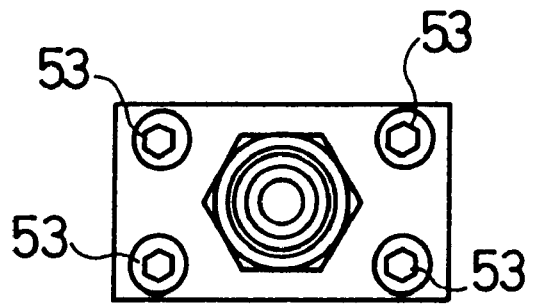
FIG. 8(a) is a plane view of a pressure gauge in the process gas supply unit.
Figure 8B:
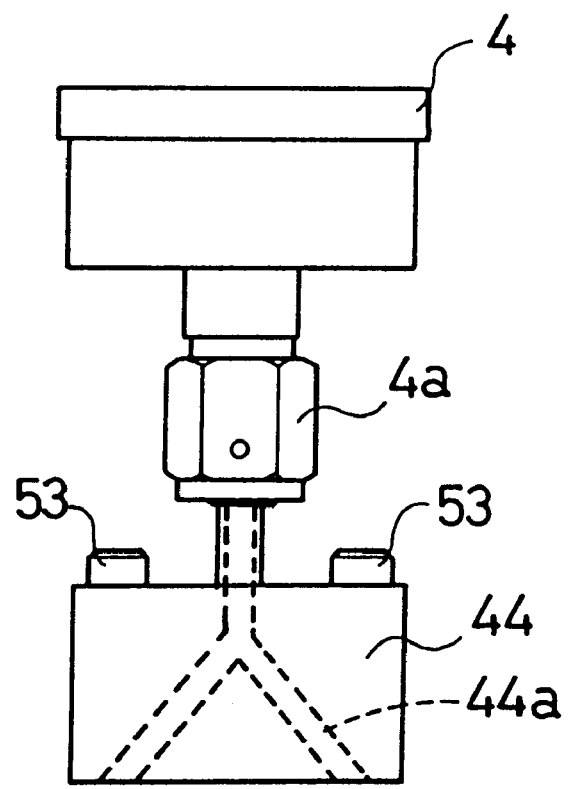
FIG. 8(b) is a side view of the pressure gauge of FIG. 8(a)

The pressure gauge block 44 on which the pressure gauge 4 is mounted forms a pressure gauge module, which is shown in FIGS. 8(a) and 8(b). As shown in FIG. 8(b), the pressure gauge 4 is mounted on the pressure gauge block 44 by a joint 4a and the pressure gauge block 44 is fixed on the base plates 22 and 23 with four bolts 53. In the pressure gauge block 44, an inverted V-shaped passage 44a is formed and communicates with an output port 33(A–C) of the base plate 22 and an input port 32(A–C) of the base plate 23. The top of the inverted V-shaped passage 44a is connected to the pressure gauge 4.

Figure 9:
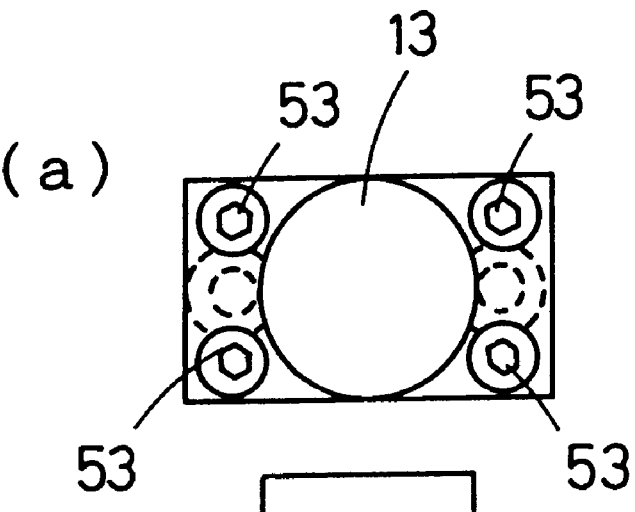
FIG. 9(a) is a plane view of a filter module in the process gas supply unit.
FIG. 9(b) is a side view of the filter module of FIG. 9(a)
Figure 9:
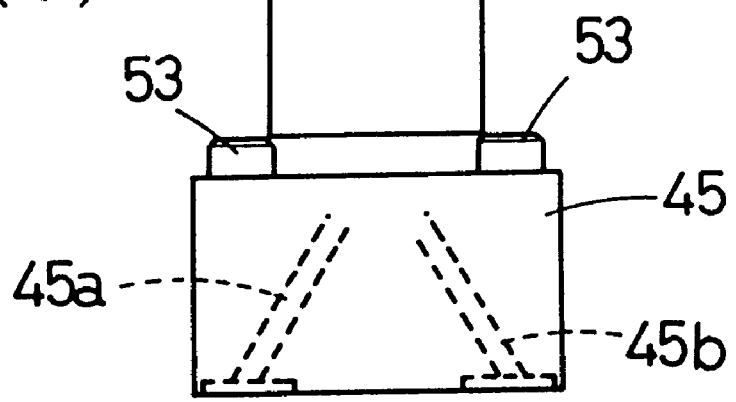

The filter block 45 to which the filter 13 is attached forms a regulator module, which is shown in FIGS. 9(a) and 9(b). As shown in FIG. 9(b), the filter 13, a metal filter, is attached to the filter block 45 by press-fitting. The filter block 45 is fixed on the base plates 23 and 24 with four bolts 53. In the filter block 45 are formed a slanting passage 45a for connecting an input port of the filter 13 with the output port 33(A–C) of the base plate 23 and another slanting passage 45b for connecting an output port of the filter 13 with the input port 32(A–C) of the base plate 24.

Figure 10:
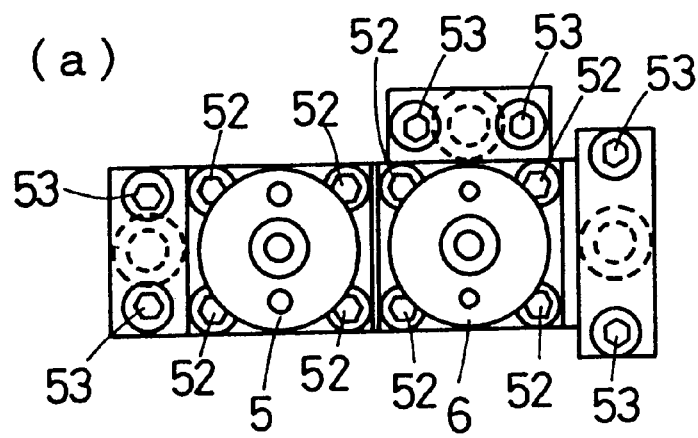
FIG. 10(a) is a plane view of an input valve block and a second input valve block in the process gas supply unit.
FIG. 10(b) is a side view of the input valve block and a second input valve block of FIG. 10(a)
Figure 10:
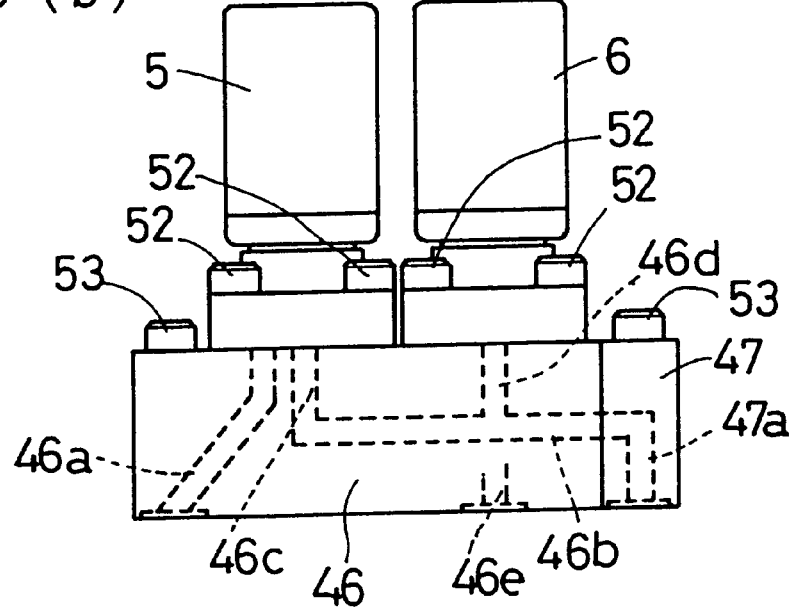

The structures of the input valve block 46 and the input valve second block 47 are described referring to FIGS. 10(a) and 10(b). In the module block rows L1 and L2, the input valve 5(A, B) and the purge valve 6(A, B) are fixedly mounted on the input valve block 46(A, B). In the module block row L3, the purge gas main valve 14 and the check valve 7 are fixedly mounted on the input valve block 46C (see FIG. 5).

The input valve 5 and the purge valve 6 are fixedly mounted from above on the input valve block 46 with four bolts 52 each. The input valve second block 47 is integrally connected with the input valve block 46 with the bolts (not shown) tightened from the right in FIG. 10(b). The input valve block 46 and the input valve second block 47 are integrally installed on the base plates 24, 25, and 26 from above with two bolts 53 each.

Formed in the input valve block 46(A, B) are a slanting passage 46a for connecting the output port 33(A, B) of the base plate 24 with the input port of the input valve 5, a straight passage 46b, a passage 46c for connecting the output port 5 with the straight passage 46b, and a passage 46d for connecting the output port of the purge valve 6 with the straight passage 46b.

On the other hand, on the input valve block 46C for the module block row L3 are mounted the check valve 7 instead of the input valve 5 and the purge gas main valve 14 instead of the purge valve 6. In the input valve block 46C, the output port of the check valve 7 communicates with the input port of the purge gas main valve 14 and, instead of the straight passage 46b, a passage 46e is formed for connecting the output port of the check valve 7 with the through hole 39 in the base plate 25 through the purge gas port 40C.

A mass flow controller input block 48 and a mass flow controller output block 49 are fixedly connected with an input side and an output side of the MFC 8 respectively from opposite lateral sides. The MFC 8, the MFC input block 48, and the MFC output block 49 are integrally mounted from above on the base plates 26 and 27 with bolts 53.

A V-shaped passage 26a in the base plate 26 connects a flow passage of the input valve second block 47 and that of the MFC input block 48. A V-shaped passage 27a connects a flow passage of the MFC output block 49 and that of the output valve block 50.

Figure 11:
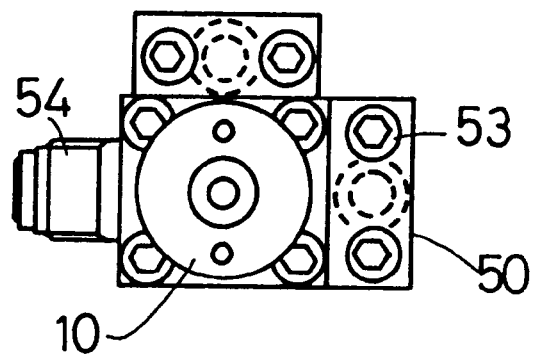
FIG. 11(a) is a plane view of an output valve module in the process gas supply unit.
FIG. 11(b) is a side view of the output valve module of FIG. 11(a)
Figure 11:
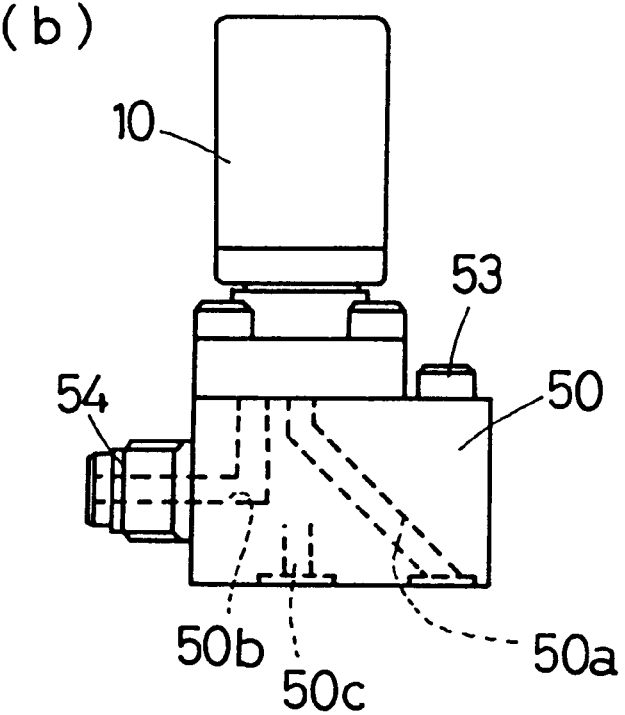

The output valve block 50 on which the output valve 10 shown in FIG. 4 is mounted forms an output valve module, which is shown in FIG. 11(a) and 11(b). The output valve 10 is attached on the output valve block 50 from above with four bolts 52. In FIGS. 11(a) and 11(b), an output joint 54 is attached to a left side plane of the output valve block 50.

Formed in the output valve block 50 are a right-angled passage 50b for connecting the output joint 54 with an output port of the output valve 10 and a slanting passage 50a for connecting an input port of the output valve 10 with the output port 33(A–C) of the base plate 27. The output valve block 50 is tightened to the base plate 28 with two bolts 53.

With respect to an output valve block 50C for the module block row L3, a purge valve 6C is mounted thereon instead of the output valve 10. In the output valve block 50C, a passage 50c for connecting an output port 5C with the through hole 30 of the base plate 28 is formed instead of the straight passage 50b.

The action of the process gas supply unit constructed as above will be described below.

To supply process gas A to the vacuum chamber, the input valve 5 and the output valve 10A are opened to feed process gas A to the MFC 8 through the manual valve 1A and the filter 13A. In this respect, the pressure of process gas A is maintained in a constant level by the regulator 3A and the pressure gauge 4A. The MFC 8A supplies the process gas A of a fixed mass to the vacuum chamber through the output valve 10A.

The supply of process gas A is terminated in the following manner. The input valve 5A and the output valve 10A are closed and the purge valve 6A and the purge valve 6C are opened. At this time, the purge gas main valve 14 is opened to allow purge gas to flow in each of the passages through the purge valve 6A and the purge valve 6C, thus flushing the process gas A remaining in the passages with the purge gas. The reverse flow of the process gas A to the purge gas line is prevented by the check valve 7.

The supply of process gas B is conducted in the same steps as those for supplying process gas A.

In the process gas supply unit, the high corrosive gas is used for process gas and therefore it is likely that the gas may corrode with a lapse of time the surfaces of the passages in the components, i.e., the regulator 3, the pressure gauge 4, the filter 13, the input valve 5, the purge valve 6, the check valve 7, the MFC 8, the output valve 10 and the like, causing the generation of particles. To prevent it, the periodic inspection or replacement is conducted by detaching the above components.

In the process gas supply unit in the first embodiment, each module block of the manual valve block 42, the regulator block 43, the pressure gauge block 44, the filter block 45, the input valve block 46, the MFC input block 48, the MFC output block 49, and the output valve block 50 are fixed from above on the base plates 21–28 respectively with the bolts 53. This structure facilitates detachment/attachment of each component for inspection or replacement.

Furthermore, since the base plates 21–28 are installed on the mounting panel 12 with the bolts 35 from the same direction as the bolts 53, the base plates can be detached from the panel 12 positioned as it is after the module blocks were detached from the base plates. This can enhance the working efficiency in the periodic inspection or replacement needed to prevent the possibility that the flow passages formed in the base plates through which process gas is made to flow may be corroded to generate particles.

Here, the head of the bolt 35 whereby the base plate is tightened on the mounting panel 12 lies inside the counterbore 31a (31b), thereby preventing an operator from removing the bolt 35 in mistake for the bolt 53 for module blocks in detaching the module blocks.

The communicating passage in the base plate is V-shaped, providing no portion where process gas may accumulate, thus reducing the corrosion of the passage in the base plate.

Since the base plates are arranged in a direction orthogonal to the module block rows and connected with two or more module block rows, the number of bolts 53 to fasten the base plates to the mounting panel can be reduced. Also, the formation of the through hole 39 can provide the passage for supplying purge gas and the like to each supply line.

Figure 16:
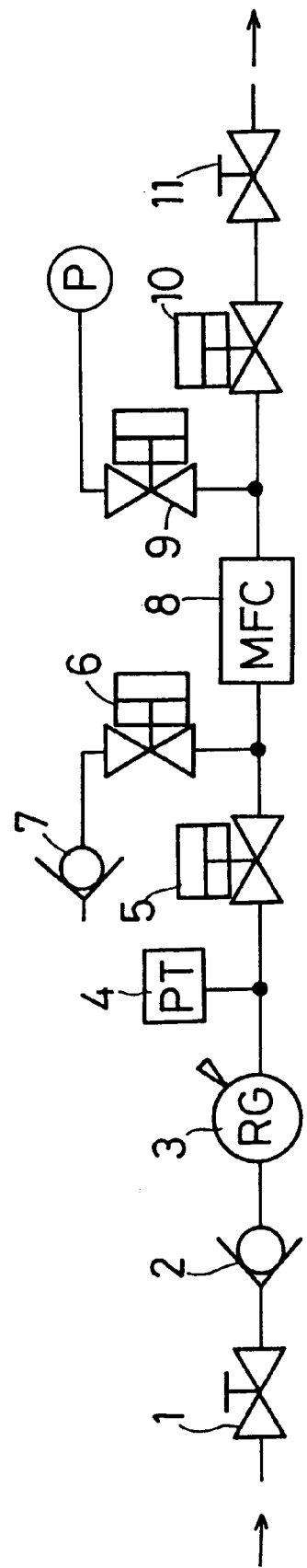
FIG. 16 is a diagrammatic view showing the flow circuit of the conventional process gas supply unit.

Next, a process gas supply unit in a second embodiment according to the present invention will be described. This embodiment is to realize the circuit shown in FIG. 16 described above in accordance with the prevent invention.

Figure 12:
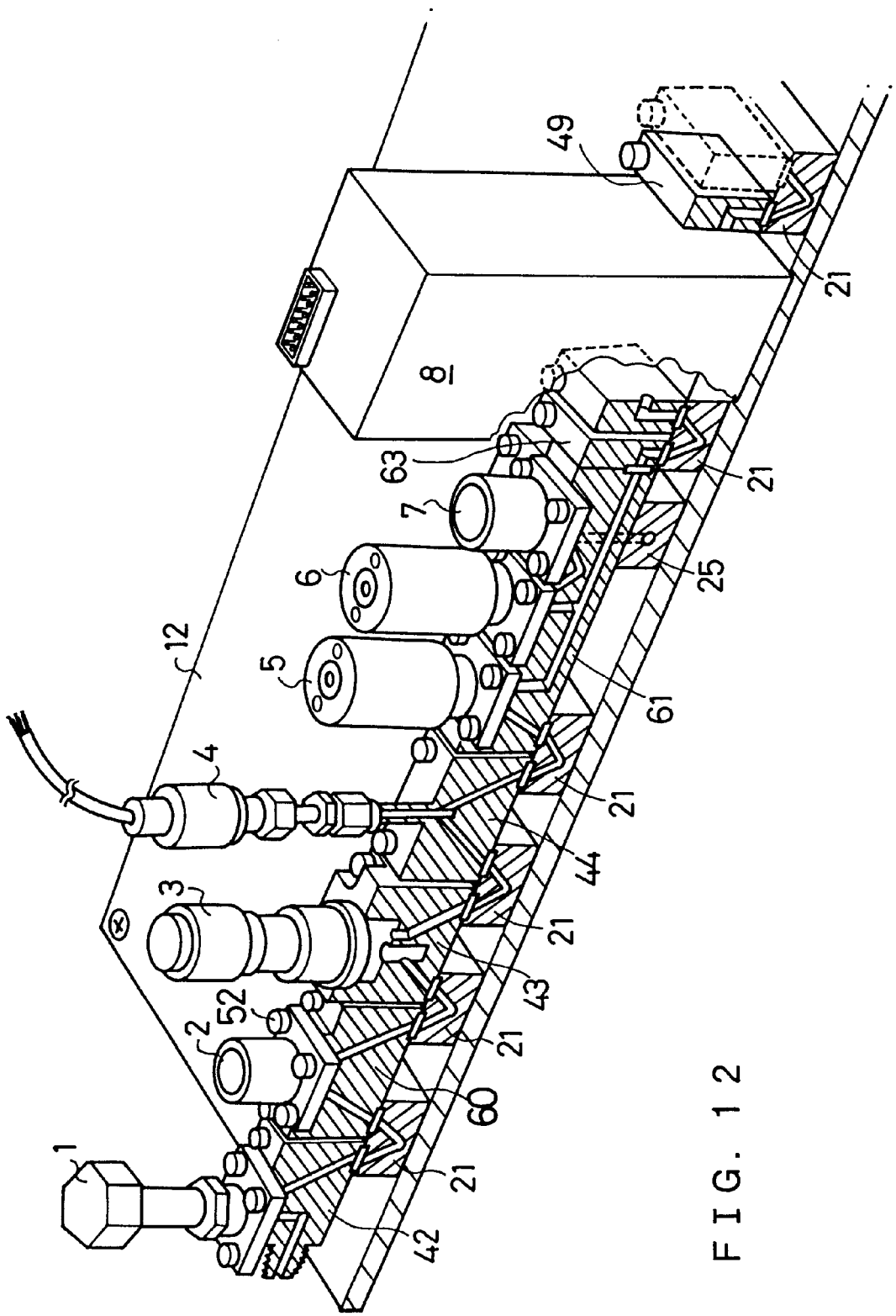
FIG. 12 is a first perspective view of a part of a process gas supply unit in a second embodiment according to the present invention, which is a partially sectional view.
Figure 13:
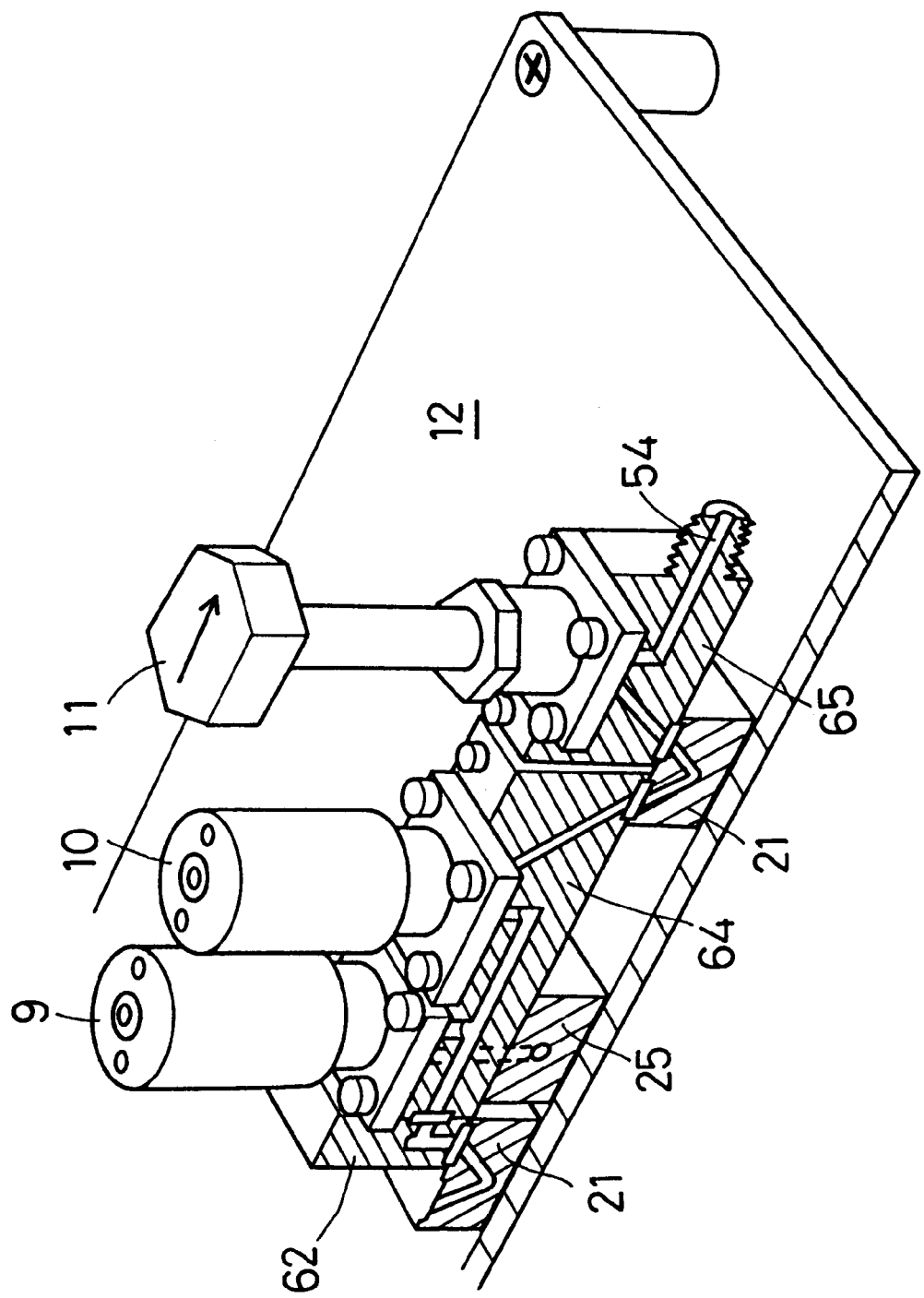
FIG. 13 is a second perspective view of another part of the process gas supply unit in the second embodiment.
Figure 14:
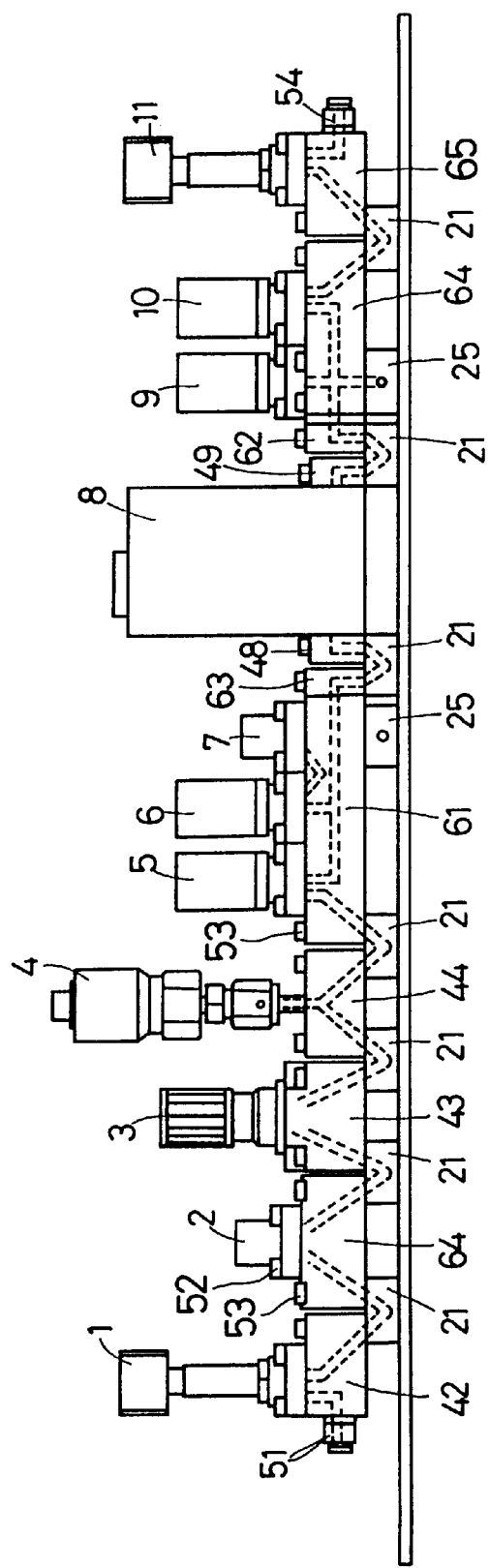
FIG. 14 is a side view of the process gas supply unit in the second embodiment.
Figure 15:
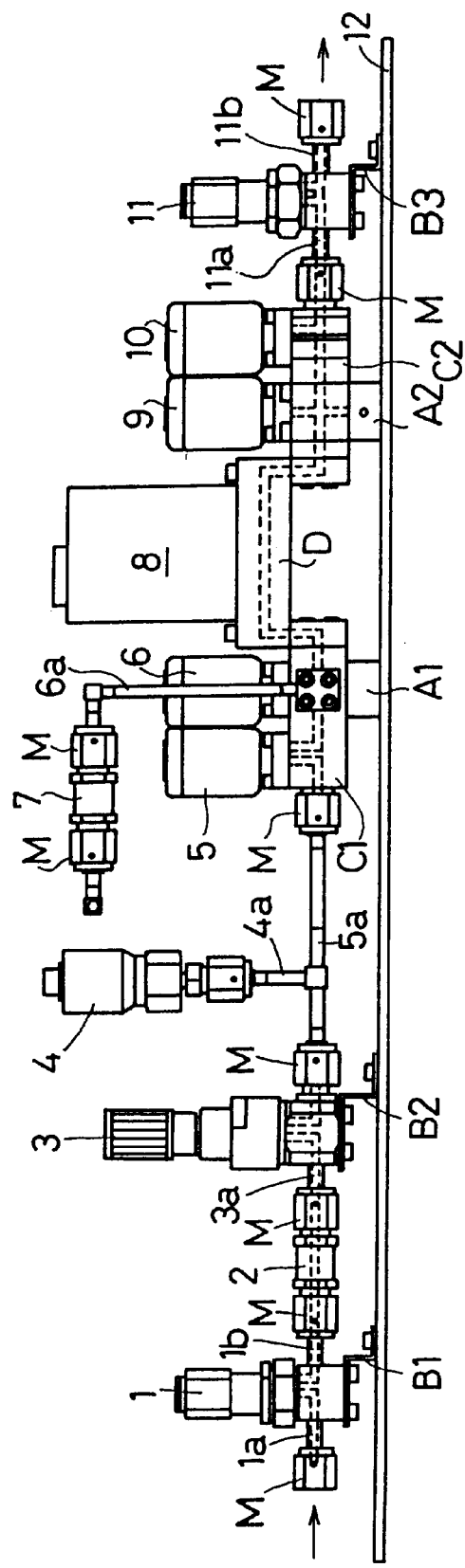
FIG. 15 is a side view of a conventional process gas supply unit.

FIGS. 12 and 13 are partial views of the process gas supply unit in the second embodiment. By connecting the right end of FIG. 12 to the left end of FIG. 13, the entire unit is shown. FIG. 14 is a side view of the entire unit. It is noted that the module blocks and the base plates are shown as sectional views cut along a center line in the row direction with respect to a module block row in FIGS. 12 and 13. The same module blocks as in the first embodiment are applied with the same numerals and its description is omitted. only the different structure from the first embodiment is explained below.

The check valve 2 is mounted from above on a check valve block 60 with four bolts 52. The check valve block 60 is integrally fixed from above on the base plate 21 with four bolts 53. In the present embodiment, a hexagon socket head bolt having a thread size of 5 mm is used for the bolts 52 and 53.

Onto an input valve block 61, the input valve 5, the purge valve 6, and the check valve 7 are attached from above with four bolts 52 each. An input valve exit side block 63 is attached to the input valve block 61 from its side with bolts not shown.

The input valve block 61 and the input valve exit side block 63 are mounted on the base plate 21 from above with four bolts 53. As shown in FIG. 13, on an output valve block 64 are mounted the vacuum valve 9 and the output valve 10 from above with four bolts 52 each.

An output valve entry side block 62 is fixed on the output valve block 64 from its side with bolts not shown. The output valve block 64 and the output valve entry side block 62 are mounted on the base plate 21 from above with four bolts 53. A manual valve block 65 on which the exit side manual valve 11 is mounted has the same structure as the entry side manual valve block 42, which is merely reversely placed.

In the process gas supply unit in the second embodiment, similarly to the first embodiment, all of the module blocks are mounted on the base plates from above with the bolts 53 and all of the base plates are attached onto the mounting panel 12 from above with the bolts 35. Accordingly, the base plates can be detached from the mounting panel positioned as it is after the module blocks were removed, providing a high working efficiency. In the second embodiment, similarly, a hexagon socket head bolt having a thread size of 5 mm is used for the bolts 52 and 53.

In the process gas supply unit of the first and second embodiments, the bolts for fastening the base plates and the module blocks are standardized in number and position. Further, the bolt 52 for components, the bolt 53 for module blocks, and the bolt 35 for base plates are preferably all a hexagon socket head bolt having a thread size of 5 mm, which is suitable for maintenance. When plural supply units are arranged in parallel, the mass flow controllers 8 in the units are placed side by side, which is also suitable for maintenance. The base plate can be made common to the units.

The present invention may be embodied in other specific forms without departing from the spirit or essential characteristics thereof. For instance, although a mass flow controller, a supply valve, a purge valve, a vacuum valve, a check valve, a regulator, and a filter are shown as the components mounted on the module blocks in the above embodiments, other components for gas supply may be used as necessary. The same effect can still be obtained.

In the process gas supply unit according to the present invention, the base plate 21 may directly be mounted on a metal plate forming a wall and the like without use of the mounting panel 12.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A process gas supply unit comprising:
   at least two module blocks, each having a gas passage and to which one or more component parts used for supplying process gas are bolted;
   a base block having a mounting surface on which the at least two module blocks are bolted; and
   a mounting panel on which the base block is bolted;
   wherein the at least two module blocks and the base block each have a passage connecting part on at least one of an upper and a lower surface, and are connected in face to face relation by bolts accessible from one side of the mounting panel, and the at least two module blocks are arranged in at least two parallel module block rows, the at least two module block rows being parallel for receiving, respectively, at least two kinds of process gas to be supplied, and the base block is orthogonal to the module block rows and is connected with at least two module blocks in each of the module block rows to supply different kinds of process gas to the respective module block rows.

2. A process gas supply unit according to claim 1, wherein the component parts comprise at least one of a mass flow controller, a supply valve, a purge valve, a vacuum valve, a check valve, a regulator, and a filter.

3. A process gas supply unit according to claim 1, including means for positioning the base block relative to the mounting panel.

4. A process gas supply unit according to claim 3, wherein the positioning means comprises a combination of a positioning pin and a positioning hole.

5. A process gas supply unit according to claim 1, wherein a head of a bolt for tightening the base block to the mounting panel is received in a counter bore in the base block so that the head of the bolt is below an upper surface of the module block.

6. A process gas supply unit according to claim 1, wherein the module block is attached to the base block so that the module block is in surface-contact with the base block.

7. A process gas supply unit according to claim 1, wherein the component parts, the module block, and the base block are mounted with bolts from the same direction.

8. A process gas supply unit according to claim 1, wherein a substantially V-shaped passage is formed in the base block.

9. A process gas supply unit according to claim 7, wherein a substantially V-shaped passage is formed in the base block.

10. A process gas supply unit according to claim 7, wherein a head of a bolt for tightening the base block to the mounting panel is inside of a counter bore in the base block, which is invisible on an upper surface of the module block.

11. A process gas supply unit, comprising:

at least first and second component parts each selected from the group consisting of a valve, a filter, a mass flow controller, a gauge, and a regulator;

at least first and second module blocks, the first and second component parts being attached to the first and second module blocks, respectively, each of the first and second module blocks having a first internal passageway having opposite ends, one of the opposite ends of the first passageway being in communication with the component part attached thereto; and a base block attached to the first and second module blocks, the base block having a second, substantially V-shaped internal passageway having two ends, one of the two ends of the second passageway being in communication with the other of the opposite ends of the first passageway, wherein the first and second module blocks are arranged in at least two parallel module block rows, the at least two module block rows being parallel for receiving, respectively, at least two kinds of process gas to be supplied, and the base block is orthogonal to the module block rows and is connected with the first and second module blocks in each of the module block rows to supply different kinds of process gas to the respective module block rows.

* * * * *